Figure 1:
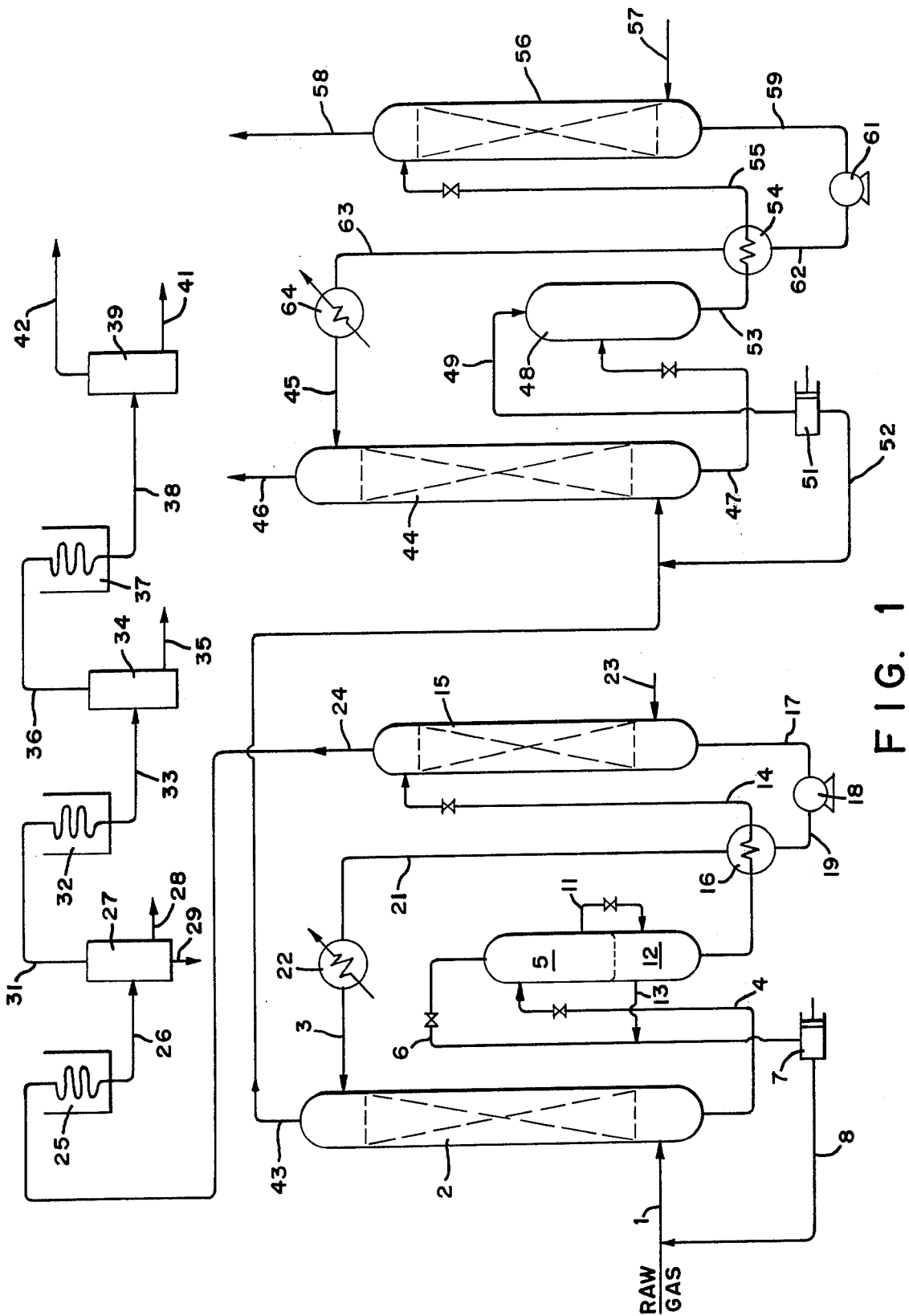

United States Patent [19]

Sweny et al.

[11] 3,877,893

[45] Apr. 15, 1975

[54] ABSORPTION AND SEPARATION OF NORMALLY LIQUID GAS CONTAMINANTS

[75] Inventors: John W. Sweny, River Vale; Frank C. Burkhard, Jr., Boonton, both of N.J.

[73] Assignee: Allied Chemical Corporation, New York, N.Y.

[22] Filed: May 10, 1973

[21] Appl. No.: 359,033

[52] U.S. Cl. ................................... 55/48
[51] Int. Cl. ........................... B01d 53/14
[58] Field of Search .............. 55/48, 51, 68, 73, 93, 55/94; 208/340, 341

[56] References Cited
UNITED STATES PATENTS

| | | |
|---|---|---|
| 3,531,917 | 10/1970 | Grunewald et al. ............... 55/73 |
| 3,536,775 | 10/1970 | Hutson et al. ...................... 55/68 |
| 3,702,296 | 11/1972 | Arnold et al. ...................... 55/68 |
| 3,770,622 | 11/1973 | Freireich et al. .................. 55/68 |

Primary Examiner—Charles N. Hart
Attorney, Agent, or Firm—Gerhard H. Fuchs

[57] ABSTRACT

Treatment of gas mixtures containing combustible gas such as methane, hydrogen and carbon monoxide and containing as contaminants acid gas, i.e., hydrogen sulfide and carbon dioxide, and normally liquid contaminants embracing aromatic hydrocarbons, non-acidic sulfur compounds and hydrogen cyanide to separate the normally liquid gas contaminants and the acid gas.

13 Claims, 4 Drawing Figures

FIG. 1

ABSORPTION AND SEPARATION OF NORMALLY LIQUID GAS CONTAMINANTS

This invention relates to the removal of normally liquid contaminants in gas mixtures and more particularly refers to a new and improved process for separating and recovering normally liquid contaminants and separating and recovering acid gas both of which are contained in gas mixtures employing a single solvent medium.

The demand for combustible gas such as methane, hydrogen and carbon monoxide is ever increasing. Combustible gas is generated or derived from fossil fuels such as coal, petroleum, shale, oil or tar sands by various processes as for example, coal carbonization, cracking, partial combustion, and water gas reaction. Since fossil fuels are composed of a complex mixture of various compounds, naturally, the combustible gas produced therefrom contains a number of contaminants. A major contaminant is acid gas which may be hydrogen sulfide or carbon dioxide or quite frequently both and which must be removed from fuel gases to reach proper heating value and to control pollution. In addition to these, other contaminants appear in somewhat smaller concentration which must also be removed to give the product gas a proper hydrocarbon dewpoint, to control pollution or to recover the contaminant as a valuable by-product. One class of such contaminants to which the present invention is particularly directed is the normally liquid contaminants embracing aromatic hydrocarbons, non-acidic sulfur compounds, and hydrogen cyanide, all of which are normally liquid at a temperature of 20°C.

One group of such contaminants is comprised of the aromatics benzene, toluene and xylene. These contaminants appear not only in gases from coal, but also in gases from heavy petroleum fractions. If left in the product gas in sufficient quantity, the dewpoints of the gas may be too high to allow transportation in a pipeline because of the appearance of condensed liquids and solids. These aromatics should not only be removed from pipeline gas but also separated from the hydrogen sulfide bearing waste gas, which now is generally processed in a Claus plant to convert $H_2S$ to harmless, non-polluting elemental sulfur. This sulfur is often sold as a valuable by-product whose value may be seriously reduced if it has a dark color, likely to happen if benzene appears in Claus feed in any significant quantity. The aromatics are themselves valuable by-products.

Another group of contaminants which need to be removed from fuel gas are the non-acidic sulfur compounds such as thiophene and its homologs, organic sulfides and carbon disulfide. These must be removed to control pollution since on burning they will yield $SO_2$, and in the case of synthetic natural gas to avoid methanation catalyst poisoning. Carbon disulfide need only be removed from the product gas; it can be left in the hydrogen sulfide stream to the Claus plant without adverse affect. Thiophene, however, can cause "a dark sulfur" so it and its homologs should be separated from the Claus plant feed.

A third substance requiring removal is hydrogen cyanide, a highly toxic substance. Hydrogen cyanide can be tolerated in Claus gas at least to about 0.5 percent, but over this value may contribute to catalyst plugging in which case it should be separated from the Claus feed, as benzene and thiophene are above. The following tabulation lists the constituents found in fuel gas and their boiling points.

| NORMALLY GASEOUS | BOILING POINT °C. |
|---|---|
| Hydrogen $H_2$ | −253 |
| Carbon Monoxide CO | −190 |
| Methane $CH_4$ | −161 |
| Carbon Dioxide $CO_2$ | − 78 |
| Hydrogen Sulfide $H_2S$ | − 62 |
| Sulfur Dioxide $SO_2$ | − 10 |

| NORMALLY LIQUID | BOILING POINT °C. |
|---|---|
| Hydrogen Cyanide HCN | 26 |
| Carbon Disulfide $CS_2$ | 46.3 |
| Benzene $C_6H_6$ | 80 |
| Thiophene $C_4H_4S$ | 84 |
| Toluene $CH_3 \cdot C_6H_5$ | 110.6 |
| Methyl Thiophene $CH_3 \cdot C_4H_3S$ | 115 |
| Dimethyl Disulfide $CH_3.S.S.CH_3$ | 117 |
| Xylene $C_6H_4(CH_3)_2$ | 144 |

The concentration of the foregoing contaminants will vary dependent upon the source and the method of obtaining the gas. Merely as illustrative, the following is a typical analysis of a coal-gasifier product:

| | |
|---|---|
| $H_2S$ | 9800 vol. ppm |
| Thiophenes | 31 |
| Methyl thiophenes | 10 |
| Dimethyl thiophenes | 10 |
| Benzene | 340 |
| Toluene | 94 |
| Xylenes | 24 |
| $CS_2$ | 10 |
| HCN | trace to 100 |

In accordance with the present invention a gas mixture containing acid gas selected from the group consisting of hydrogen sulfide and carbon dioxide may be treated to remove minor amounts in the gas mixture of normally liquid contaminants selected from the group consisting of aromatic hydrocarbons, non-acidic sulfur compounds and hydrogen cyanide by a process involving the steps of (a) passing a dialkyl ether of a polyethylene glycol solvent having 1 – 8 carbon atoms in each alkyl group and 3 – 8 ethylene units in intimate contact with the gas mixture in an absorption zone to effect absorption of at least a major portion of the normally liquid contaminants; (b) passing the solvent containing absorbed normally liquid contaminants together with some dissolved acid gas to a volatization zone to vaporize the normally liquid contaminants and acid gases from the solvent; (c) cooling the mixture of vapors of normally liquid contaminants and acid gas vaporized from the solvent to effect condensation of the normally liquid contaminants; (d) collecting the liquid condensate to effect separation of normally liquid contaminants from the acid gas; and (e) discharging the acid gas.

In one embodiment of the process as described above all the acid gas and normally liquid contaminants are removed in the absorption zone and a product gas substantially free of acid gas and liquid contaminants is discharged from the absorption zone, and wherein the solvent containing the liquid contaminants and the acid gas from the absorption zone is first subjected to flashing at a pressure lower than the absorption zone to liberate a portion of the more volatile constituents which are returned to the absorption zone and the solvent containing the acid gas and normally liquid contaminants are passed to a stripping zone wherein gases consisting primarily of acid gases are released from the solvent and the solvent containing liquid contaminants is passed to a second stripping zone wherein the liquid contaminants are volatilized and collected, and the solvent from the second stripping zone is returned to the absorption zone.

A more specific embodiment is a process for treating a gas mixture containing as the major components combustible gases selected from the group consisting of methane, carbon monoxide and hydrogen together with lesser amounts of acid gas selected from the group consisting of hydrogen sulfide and carbon dioxide and minor amounts of normally liquid contaminants selected from the group consisting of aromatic hydrocarbons, non-acidic sulfur compounds and hydrogen cyanide to produce a combustible gas as one product substantially free of acid gas and normally liquid contaminant and to produce as another product an acid gas substantially free of combustible components and normally liquid contaminants and to produce as a third product normally liquid contaminants which comprises (a) passing the gas mixture upwardly through an elongated vertical absorption column counter-current and in intimate contact with a downwardly flowing liquid solvent composed of a mixture of dimethylethers of polyethylene glycols to effect absorption of substantially all of the normally liquid contaminants and all of the acid gas at a temperature within the range of 10° - 120°F. and a pressure of 100 - 2000 pounds per square inch absolute; (b) releasing combustible gas substantially free of normally liquid contaminants and containing less than 5 parts per million hydrogen sulfide; (c) passing the solvent containing the absorbed normally liquid contaminants and acid gas together with minor amounts of combustible gas to a flashing zone maintained at a pressure at least 50 pounds lower than the pressure in the absorption zone to effect liberation of dissolved combustible gas; (d) returning the liberated gases from the flashing zone to the absorption tower; (e) passing the solvent from the flashing zone to a stripping tower maintained at a temperature of from about 200° to 300°F. and a pressure within the range of 1 to 100 pounds per square inch absolute; (f) introducing steam into the bottom of the stripping tower to strip the solvent in the tower of acid gases substantially free of other constituents; (g) passing the solvent substantially free of acid gas from the bottom of the stripping column to a second stripping column maintained at a temperature of about 200° to 400°F. and a pressure of about 1 to 20 pounds per square inch absolute; (h) introducing steam into the second stripping tower to vaporize the normally liquid contaminants together with very minor amounts of acid gas; (i) condensing and collecting the normally liquid contaminants; and (j) returning the lean solvent from the bottom of the second stripping column to the top of the absorption column.

FIG. 1 diagrammatically illustrates one method of carrying out the present invention for separating normally liquid contaminants and acid gas from a gas mixture.

Figure 2:
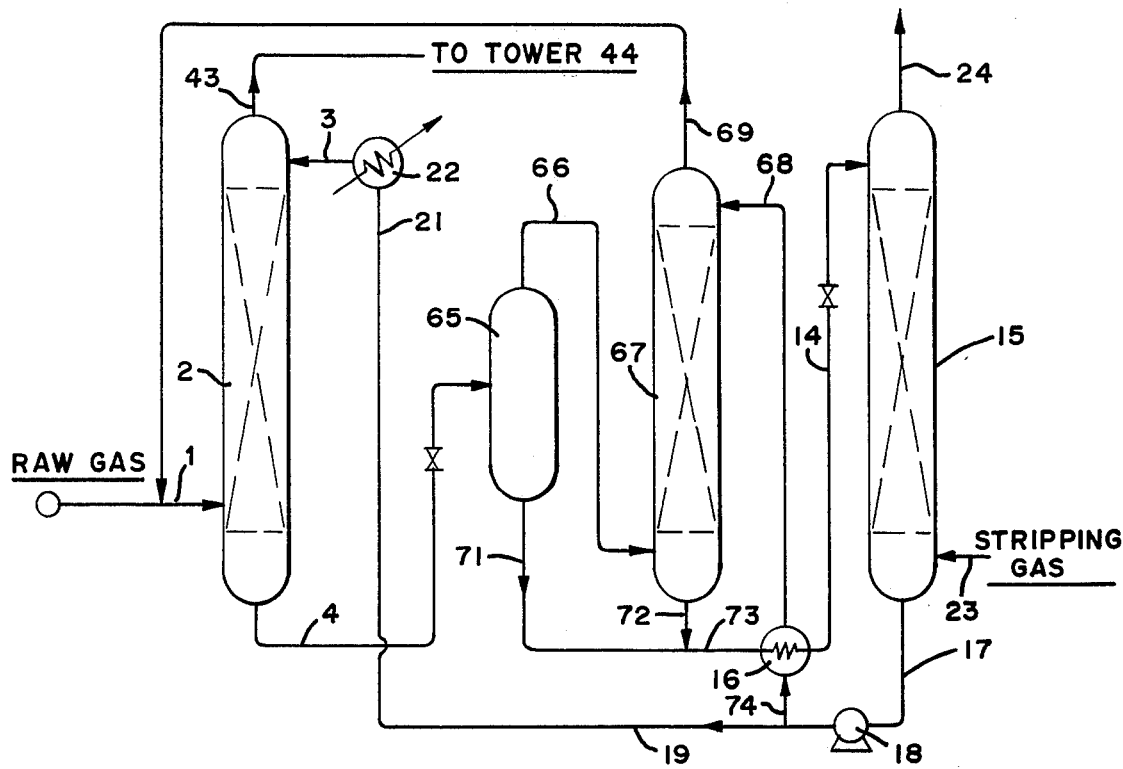

FIG. 2 diagrammatically illustrates a modification of the process of FIG. 1.

Figure 3:
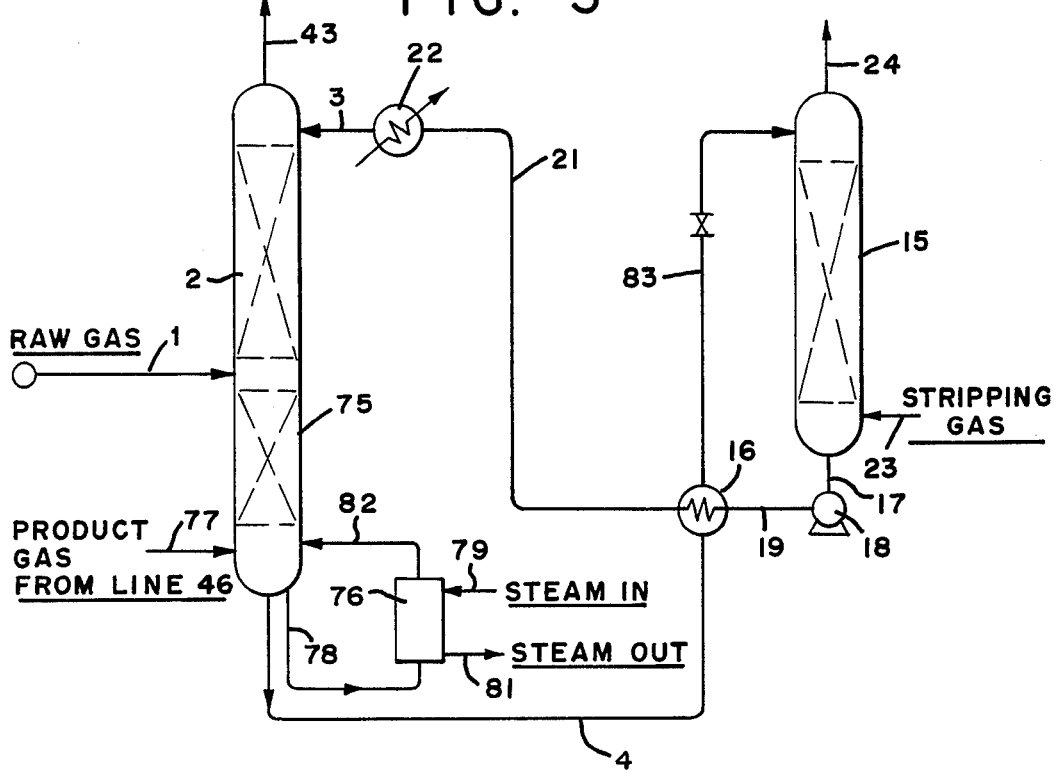

FIG. 3 diagrammatically illustrates another modification of the process of FIG. 1.

Figure 4:
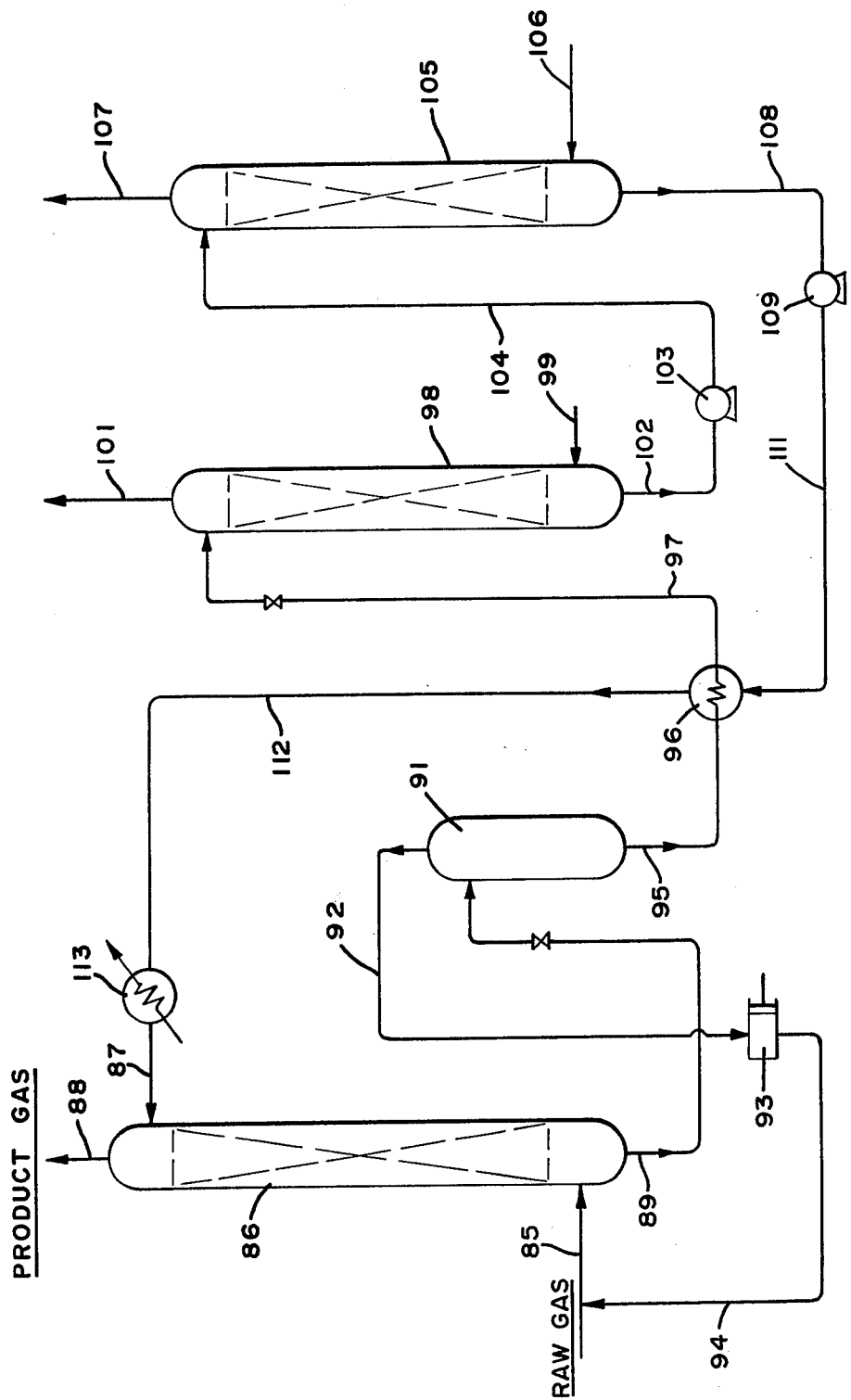

FIG. 4 diagrammatically illustrates an alternative method of effecting separation of the normally liquid contaminants and the acid gas from a mixture of gases.

Referring to FIG. 1, raw gas, containing the major components of methane, $CO_2$ and $H_2S$ or $H_2$, CO, $CH_4$, $CO_2$ and $H_2S$ plus one or more of the minor components mentioned above, e.g., $CS_2$, $C_6H_6$, $C_4H_4S$ and HCN is introduced through line 1 into the bottom of absorber column 2 which may be a vertical tower packed with solid material such as Pall ring packing or perforated plates or preferably valve trays to obtain intimate contact between the rising gases and the downflowing liquid. Although atmospheric pressure may be employed, pressure within the range of 100 to 2000 pounds per square inch absolute, preferably 200 to 500 pounds per square inch absolute, is desirably maintained in the tower. Solvent medium is introduced into the top of absorption tower 2 through line 3 and flows downwardly countercurrent to and in intimate contact with raw gas entering through line 1. The rate of flow of solvent and temperature is regulated to remove the normally liquid contaminants substantially completely from the raw gas while repressing the absorption of the acid gas ($H_2S$ or $CO_2$). This may be accomplished by maintaining the temperature in the tower within the range of 10° to 120°F., up to 400°F. dependent on the feed composition, preferably 70° to 110°F. in a solvent/gas ratio of about 0.002 to 2 pounds of solvent per standard cubic foot of raw gas scrubbed. Some quantity of the acid gas component, i.e., $H_2S$ and $CO_2$, plus quantities of the major components, i.e., $CH_4$, $H_2$ and CO, are unavoidably absorbed.

The liquid solvent to the process is a dialkyl ether of a polyethylene glycol having 1-8 carbon atoms in each alkyl group and 3-8 ethylene units. The preferred solvent is a dimethylether of polyethylene glycol, preferably a mixture of dimethylether polyethylene glycols.

Recovery of the combustible constituents such as methane, hydrogen and carbon monoxide dissolved in the solvent may be accomplished by passing the solvent from the bottom of absorption column 2 through line 4 into flash tank 5 maintained at a pressure of about atm. to 800 pounds per square inch absolute, preferably about 100 to 500 pounds per square inch absolute. Gas containing combustible constituents are released from the top of flash tank 5 through line 6, and forced by compressor 7 through line 8 into line 1 wherein it is returned to the absorption tower 2 for further scrubbing. Flashing may be accomplished in one stage or more. A two-stage flashing operation is illustrated in FIG. 1. After partial flashing liquid solvent is transferred through line 11 to second flash chamber 12. Additional gases released from the top of flash chamber 12 through line 13 pass to line 6 and then by means of compressor 7 continue through line 8 and line 1 into absorption tower 2.

The solvent from the bottom of flash tank 12 is directed through line 14 to the top of stripping column 15 to remove normally liquid contaminants. Prior to entering the top of stripping column 15, the solvent is passed through heat exchanger 16 wherein by indirect heat exchange with stripped solvent from the bottom of tower 15, it is raised to a higher temperature prior to entering stripping column 15. Lean solvent is withdrawn from the bottom of stripping column 15 through line 17 and pump 18, thence through line 19, heat exchanger 16 wherein it is partially cooled and through line 21 and heat exchanger 22 and finally through line 3 into the top of the scrubbing tower 2. Heat exchanger 22 in which the cooling medium may be water or any other suitable liquid, is provided to assist in regulating the temperature of the top of absorption column 2. Stripping of the normally liquid contaminants contained in the solvent in stripping column 15 is effected by the introduction of an inert gas through line 23 which gas may be steam, nitrogen, hydrogen, air or methane, preferably steam. Stripping is carried at some pressure between about 1 and 60 pounds per square inch absolute, generally at atmospheric pressure. The temperature in stripping column 15 may be within the range of 50° to 400°F., preferably from 200° to 300°F. Vapors of normally liquid contaminants together with stripping gas are released from the top of stripping column 15 through line 24. As previously mentioned, the normally liquid contaminants may be one or more of a mixture of contaminants varying from hydrogen cyanide having a boiling point of 26° to xylene which has a boiling point of 144°C. The vapors in line 24 may be cooled to a temperature below 26°C. to condense all the normally liquid contaminants which contaminants may then subsequently be fractionated or separated by various means if it is desired to recover them as individual components. In the preferred method of operation, the condensation and separation of individual components having different boiling points is effected by partial condensation. Specifically, vapors from line 24 are passed through condenser 25 wherein the vapors are cooled by indirect heat exchange with water to a temperature of about 100° to effect condensation of the liquid constituents such as, for example, toluene and xylene. Liquid condensate together with uncondensed vapors and non-condensable gases are passed from condenser 25 through line 26 into receiver 27 wherein the vapors and gases are separated from the condensate which collects in the bottom of receiver 27. The condensate is discharged through line 28. In the event steam is used as the stripping gas, and it is condensed in condenser 25, the water will collect in receiver 27 and will form a lower layer above which will be another layer of the normally liquid contaminants. The water may be drained from the bottom of receiver 27 through line 29.

Non-condensable gas and vapors from the top of receiver 27 flow through line 31 into condenser 32 maintained at a lower temperature, say about 60°C. to effect condensation of the lower boiling point constituents for example, benzene. The condensate and vapors and non-condensable gases from condenser 32 discharge through line 33 into receiver 34. Condensate collecting in the bottom of receiver 34 is discharged through line 35. Vapors and non-condensable gas are released from the top of receiver 34 through line 36 and passed into condenser 37 where the vapors are cooled to a temperature of about 20° to effect condensation of the hydrogen cyanide gas and other constituents which are liquid at that temperature. Liquid condensate and non-condensable gases from condenser 37 are discharged through line 38 into receiver 39. The liquid condensate is withdrawn through line 41. Non-condensable gases are released from the top of receiver 39 through line 42. If the stripping gas is steam, the non-condensable gases released through line 42 would be a minor amount of gases which may even be a small amount of hydrogen sulfide which may be recovered or may be returned to the system. If methane or hydrogen, i.e., combustible gases are used as a stripping gas, such gases may be combined with the product gases.

The raw gas entering absorption column 2 through line 1 after being stripped of the normally liquid contaminants is released from the top of absorption tower 2 through line 43 to a second absorption tower 44 for removal of the acid gas, i.e., $H_2S$ and $CO_2$ from the other gases, i.e., the combustible gases, such as methane, hydrogen and carbon monoxide that make up the major portion of the gas being treated. In general, absorption tower 44 will operate at slightly lower pressure and higher temperature than absorption tower 2. Solvent entering top of tower 44 through line 45 passes downwardly countercurrent to and in intimate contact with the gases entering the bottom of the tower through line 43. The rate of flow of solvent and temperature is regulated to effect absorption of substantially all the hydrogen sulfide contained in the gas and all of the carbon dioxide. The product gas containing less than two parts per million hydrogen sulfide is discharged from absorption column 44 through line 46. Solvent containing substantially all the acid gas together with small amounts of product gas dissolved therein is withdrawn from the bottom of tower 44 through line 47 and introduced into flash tank 48 maintained at a lower pressure than tower 44 to effect release of substantially all the product gases dissolved in the solvent which are returned through line 49 and compressor 51 and line 52 to line 43 and thence into the bottom of tower 44.

The solvent containing dissolved acid gas flows from the bottom of flash chamber 48 through line 53 and then heat exchanger 54 wherein it is heated by indirect heat exchange with lean solvent and thence through line 55 into the top of stripping column 56. Stripping tower 56 operates in a manner similar to that of stripping tower 15. Gas removed from the top of tower 56 through line 58 contains hydrogen sulfide and carbon dioxide together with very small amounts of other gaseous constituents and is eminently suitable for the Claus reaction for conversion into elementary sulfur. Lean solvent is withdrawn from the bottom of stripping tower 56 through line 59 and directed by pump 61 through line 62, heat exchanger 54, line 63, heat exchanger 64, and line 45 into the top of absorption column 44.

FIG. 2 represents an alternative method of liberating non-condensable gases from the rich solvent leaving absorption column 2. In FIG. 1 it will be noted that liberation of the non-condensable gases is effected in one or more flash tanks designated in FIG. 1 as 5 and 12, and the liberated gases are then returned to the absorption tower 2. In FIG. 2, liberation of the non-condensable gases is effected by flashing but this is supplemented by reabsorption of normally liquid contaminants which are flashed off with the non-condensable gases. Referring to FIG. 2, rich solvent flows from absorption tower 2 through line 4 into flash tower 65 which functions in a manner similar to flash tower 5 in FIG. 1. Gases liberated in flash tower 65, consisting of non-condensable gases and normally liquid contaminants are released through line 66 and thence flow into the bottom of absorption chamber 67. Lean solvent entering the top of tower 67 through line 68 flows downwardly countercurrent and in intimate contact with the gases from flash tower 65 entering through line 66 into the bottom of tower 67. Thus, the normally liquid contaminants released to flash tower 65 are reabsorbed in absorption tower 67. Non-condensable gases substantially free of normally liquid contaminants are released from the top of absorption tower 67 and through line 69 and returned to absorption tower 2 via line 1. Rich solvent is passed from the bottom of flash chamber 65 through line 71 and from the bottom of absorption column 67 through line 72 into line 73 thence through heat exchanger 16, line 14, into the top of stripping tower 15. Vapors of normally liquid contaminants are released from the top of stripping tower 15 through line 24 and condensed and collected in the manner as shown in FIG. 1. The lean solvent discharging from stripping tower 15 through line 17 is forced by pump 18 through lines 19 and 21, heat exchanger 22 and line 3 into the top of absorption tower 2. A portion of the lean solvent is directed through line 74, heat exchanger 16 and line 68 into the top of absorption tower 67.

Selective absorption can be enhanced by reboiled absorption as illustrated in FIG. 3. Referring to FIG. 3, absorption tower 2 is extended to include a section 75 below the raw gas feed point entering through line 1 in which light components are stripped out of the rich liquid by heating in a reboiler 76 and, if desired, supplementing the reboiler by introduction of a gas entering through line 77. This gas should be one which can be mixed with the product gas as for example, the product gas which is released through line 46 from the top of tower 44 as shown in FIG. 1.

A portion of the liquid collecting in the bottom of section 75 flows down through line 78 in heat exchange with steam entering through line 79 and discharging through line 81 thereby generating vapors and gases from the liquid and passing the heated gases and vapors from reboiler 76 through line 82 into the bottom of section 75 where it passes upwardly to effect stripping of the liquid to remove the lighter, more volatile gases. The rich liquid, now concentrated in the desired normally liquid contaminants, passes through line 4, heat exchanger 16, line 83 into the top of stripping column 15. Vapors of normally liquid contaminants from the top of stripping column 15 flow through line 24 and are condensed and collected in the manner as shown in FIG. 1. Lean solvent from the bottom of stripping column 15 is withdrawn through line 17 and forced by pump 18 through line 19, heat exchanger 16, line 21, heat exchanger 22, line 3 into absorption column 2.

FIG. 4 diagrammatically illustrates another embodiment of the present invention. Referring to FIG. 4, raw gas containing acid gas such as hydrogen sulfide and carbon dioxide together with smaller amounts of normally liquid contaminants is introduced through line 85 into the bottom of absorption column 86 similar in construction to that previously described in connection with FIG. 1. Lean solvent is introduced into the top of absorption tower 86 through line 87 and flows downwardly countercurrent to and in intimate contact with the gases rising up the tower. Superatmospheric pressure is maintained in the tower on the order of 100 – 2000 pounds per square inch, preferably 300 – 1000 pounds per square inch absolute. The temperature may vary from 10° to 120°F. and is preferably within the range of 30° to 80°F. The rate of solvent flowing through line 87 into tower 86 should be regulated so as to remove substantially all the hydrogen sulfide contained in the raw gas, i.e., the product gas leaving the tower 86 through line 88 should preferably contain less than two parts per million hydrogen sulfide and substantially no normally liquid contaminants.

The rich solvent containing substantially all the normally liquid contaminants and acid gas together with small amounts of combustible gas contained in the raw gas flows from the bottom of tower 86 through line 89 into flash tower 91 maintained at a pressure lower than tower 86. As a result of flashing the liquid solvent in chamber 91, non-condensable combustible gas together with some acid gas in minor amounts of normally liquid contaminants are released from the top of tower 91 through line 92 and forced by compressor 93 through line 94 and line 85 into the bottom of tower 86 wherein the gases are scrubbed to remove the liquid contaminants and the acid gas therefrom and the combustible non-condensable gases are released from the top of the tower through line 88. The liquid from flash tower 91 flows down through line 95, heat exchanger 96, line 97 into stripping tower 98 maintained at a pressure within the range of 1 to 100 pounds per square inch absolute and at a temperature of about 200° to 350°F. Stripping gas is introduced through line 99 into the bottom of column 98 to strip the more volatile constituents, namely, hydrogen sulfide and carbon dioxide from the liquid. The gas released from the top of stripping column 101 consists essentially of acid gases, namely, hydrogen sulfide and carbon dioxide together with stripping gas. The liquid containing rich solvent containing liquid contaminants and substantially free of non-condensable gas discharges from the bottom of tower 98 through line 102 and is forced by pump 103 through line 104 into the top of the second stripping tower 105. The second stripping tower is maintained at a pressure of about 1 to 20 pounds per square inch absolute and at a temperature of about 200° to 350°F. Stripping gas is introduced into the bottom of the tower through line 106. Vapors of normally liquid contaminants are released from the top of tower 105 through line 107 and are condensed and collected in a manner as described and illustrated in FIG. 1. The lean solvent is withdrawn from tower 105 through line 108 and forced by pump 109 through line 111, heat exchanger 96, line 112, heat exchanger 113, line 87 into the top of absorption tower 86.

The following examples illustrate the present invention.

EXAMPLE 1

Synthesis gas from coal having the following composition is employed as the feed gas.

| COMPOSITION | MOLS/HR. | VOL % |
|---|---|---|
| $CO_2$ | 37,848 | 32.50 |
| $H_2S$ | 1,907 | 1.64 |
| $CH_4$ | 10,679 | 9.17 |
| $C_2H_6$ | 1,022 | .88 |
| $H_2$ | 50,536 | 43.40 |
| CO | 13,798 | 11.85 |
| $N_2$ | 349 | .30 |
| $C_6H_6$ | 308 | .26 |
| Total | 116,447 | 100.00 |

As will be noted the synthesis gas contains combustible components consisting of principally methane, hydrogen and carbon monoxide. Because of pollution problems, it is important to reduce the hydrogen sulfide content in the combustible gas to a level of two or less parts per million. It is also desirable to remove the hydrogen sulfide in a form suitable for conversion into sulfur in a Claus plant. Hydrogen sulfide for processing in a Claus plant cannot contain more than one volume percent of benzene, since a concentration higher than this will produce "dark sulfur". Thus, it is important to separate benzene from the hydrogen sulfide stream. In an operation as illustrated in FIG. 4, the synthesis gas is passed to an absorption tower operated at 340 pounds per square inch absolute and between 50° and 77°F. The absorption tower contains packing equivalent to 11 theoretical stages. Sixteen thousand seven hundred gallons per minute of solvent was pumped to the top of the tower and flowed down through the tower to scrub the gases of substantially all the hydrogen sulfide and benzene contained in the gases, leaving a product gas discharging from the top of the tower containing less than two parts per million hydrogen sulfide. The solvent was a mixture of the dimethylethers of diethylene glycol, triethylene glycol, tetraethylene glycol, pentaethylene glycol, hexaethylene glycol and heptaethylene glycol.

The rich liquid from the bottom of the absorption tower is passed to a flash tank maintained at 100 pounds per square inch absolute and the gases liberated by flashing return to the absorption tower. The liquid from the flash tank then passes through heat exchanger and thence into a stripper containing packing equivalent to five theoretical stages. The stripper is operated at 20 pounds per square inch absolute and between 240° to 260°F. Stripping steam at the rate of 25,000 pounds per hour is introduced into the bottom of the stripping column to produce an overhead product with the following composition:

| COMPOSITION | MOLS/HR. | VOL % |
|---|---|---|
| $CO_2$ | 4,409 | 68.81 |
| $H_2S$ | 1,907 | 29.76 |
| $CH_4$ | 8 | .12 |
| $C_2H_6$ | 20 | .31 |
| $H_2$ | 1 | .02 |
| CO | 2 | .03 |
| $N_2$ | — | — |
| $C_6H_6$ | 61 | .95 |
| Total | 6,408 | 100.00 |

This stream of gas which contains virtually all the hydrogen sulfide and a quantity of $C_6H_6$ which is below the tolerable limit of one percent is the Claus plant feed.

The bottom feed from the stripper containing the remainder of the benzene is passed to a second stripper which contains packing material equivalent to seven theoretical stages and is operated at 260°F. and at a pressure of about 15 pounds per square inch absolute. Stripping steam at the rate of 119,000 pounds per hour is introduced into the bottom of the second stripping column to remove the remaining benzene from the solvent as overhead which is condensed and collected. Any non-condensable gas is comingled with the Claus gas stream.

EXAMPLE 2

In this example, a synthesis gas having a feed composition the same as in Example 1 is processed as illustrated in FIG. 1 to remove hydrogen sulfide from the synthesis gas to virtual completion, i.e., about 2 parts per million or less in the combustible gas product, and produce a Claus plant feed which contains no more than 1 volume percent benzene.

The raw gas is fed into the bottom of an absorption column containing packing equivalent to 3.5 theoretical stages and operates at a pressure of 340 pounds per square inch absolute and a temperature of 95°F. The gas released from the top of the absorption tower contains 131 parts per million of benzene.

The rich solvent at the bottom of the absorption tower contains virtually all the benzene in the feed, 308 moles per hour, and 134 moles per hour of hydrogen sulfide. This rich liquid is passed through a flashing chamber to liberate some of the more volatile gases and then to a stripping column containing packing equivalent to four theoretical stages. The stripping tower is operated at a pressure of 20 pounds per square inch absolute and at a temperature of 260°F. Into the bottom of the stripping column is introduced 39,000 pounds per hour steam. From the top of the stripping column a mixture of steam, 308 moles per hour of benzene and 134 moles per hour of hydrogen sulfide go overhead, the vapors condensed, and the liquid benzene decanted from the liquid water.

The gas from the top of the first absorption tower containing 131 parts per million benzene passes to a second absorption tower similar in construction and operation to the first absorption tower wherein into the top is introduced solvent to remove substantially all the hydrogen sulfide from the gases entering the second absorption tower. The product gas released from the second absorption tower contains two or less parts per million hydrogen sulfide. The liquid containing hydrogen sulfide is then withdrawn from the bottom of the second absorption tower, flashed, and sent to a second stripping tower similar in construction and operation as the first stripping tower wherein hydrogen sulfide is stripped from the solvent and released from the top of the tower to be sent to the Claus plant. The lean liquid from the second stripping tower is sent to the top of the second absorption tower.

The product released from the top of the second absorption tower has the following composition:

| COMPOSITION | MOLS/HR. | VOL % |
|---|---|---|
| $CO_2$ | 4,409 | 70.79 |
| $H_2S$ | 1,773 | 28.47 |
| $CH_4$ | 8 | .13 |
| $C_2H_6$ | 20 | .32 |
| $H_2$ | 1 | .02 |
| CO | 2 | .03 |
| $N_2$ | — | — |
| $C_6H_6$ | 15 | .24 |
| Total | 6,228 | 100.00 |

The above gas suitable for use in a Claus plant contains only 0.24 mol percent benzene, well below the requirement of 1.0 percent.

We claim:

1. The process for treating a combustible synthesis gas mixture derived from fossil fuels by carbonization, cracking, partial combustion or water gas reaction containing acid gas selected from the group consisting of hydrogen sulfide and carbon dioxide to remove minor amounts in the gas mixture of normally liquid contaminants selected from the group consisting of non-acidic sulfur compounds and hydrogen cyanide which comprises:

a. passing a dialkyl ether of a polyethylene glycol solvent having 1-8 carbon atoms in each alkyl group and 3-8 ethylene units in intimate contact with the gas mixture in an absorption zone to effect absorption of at least a major portion of the normally liquid contaminants;

b. passing the solvent containing absorbed normally liquid contaminants together with some dissolved acid gas to a volatilization zone to vaporize the normally liquid contaminants and acid gases from the solvents;

c. cooling the mixture of vapors of normally liquid contaminants and acid gas vaporized from the solvent to effect condensation of the normally liquid contaminants;

d. collecting the liquid condensate to effect separation of normally liquid contaminants from the acid gas; and e. discharging the acid gas.

2. A process as claimed in claim 1 wherein the solvent containing the absorbed normally liquid contaminants together with some dissolved acid gas is prior to passage to the volatilization zone passed to a flashing zone maintained at a pressure lower than the pressure in the absorption zone to effect liberation of some of the acid gas in the solvent.

3. A process as claimed in claim 2 wherein the acid gas liberated in the flashing zone is returned to the absorption zone.

4. A process as claimed in claim 1 wherein cooling of vapors of normally liquid contaminants vaporized from the solvent is effected in stages at decreasing temperatures to produce and collect separate streams of condensate having different boiling points.

5. A process as claimed in claim 1 wherein substantially all the normally liquid contaminants and substantially all the hydrogen sulfide contained in the gas mixture is absorbed in the solvent in the absorption zone.

6. A process as claimed in claim 1 wherein the gas mixture after contact with the solvent in the absorption zone is passed to a second absorption zone in intimate contact with solvent to effect absorption of substantially all of the acid gas remaining in the gas mixture to produce a product gas substantially free of normally liquid contaminants and acid gas and the solvent containing the acid gas from the second absorber is passed to a stripping zone to liberate a gas containing primarily acid gas.

7. A process as claimed in claim 6 wherein the solvent from the second absorption zone prior to stripping is subjected to flashing at reduced pressure to release a portion of the gases from the solvent which are returned to the second absorption zone.

8. A process as claimed in claim 1 wherein substantially all the acid gas and normally liquid contaminants are removed in the absorption zone and a product gas substantially free of acid gas and liquid contaminants is discharged from the absorption zone, and wherein the solvent containing the liquid contaminants and the acid gas from the absorption zone is first subjected to flashing at a pressure lower than the absorption zone to liberate a portion of the more volatile constituents which are returned to the absorption zone and the solvent containing the acid gas and normally liquid contaminants is passed to a stripping zone wherein gases consisting primarily of acid gases are released from the solvent and the solvent containing liquid contaminants is passed to a second stripping zone wherein the liquid contaminants are volatilized and collected, and the solvent from the second stripping zone is returned to the absorption zone.

9. A process as claimed in claim 1 wherein contact of the solvent with the gas mixture in the absorption zone is effected at a temperature of 10° to 120°F. and a pressure of 100 to 2000 pounds per square inch absolute and wherein vaporization of the normally liquid contaminants is effected in a stripping zone by the introduction of steam at a temperature in the stripping zone within the range of 100° to 350°F. and a pressure of 1 to 60 pounds per square inch absolute.

10. A process as claimed in claim 1 wherein the solvent is a mixture of dimethylethers of polyethylene glycol.

11. A process for treating a gas mixture containing as the major component combustible gases selected from the group consisting of methane, carbon monoxide and hydrogen together with lesser amounts of acid gas selected from the group consisting of hydrogen sulfide and carbon dioxide and minor amounts of normally liquid contaminants selected from the group consisting of non-acidic sulfur compounds and hydrogen cyanide to produce a combustible gas as one product substantially free of acid gas and normally liquid contaminants and to produce as another product an acid gas substantially free of combustible components and normally liquid contaminants and to produce as a third product normally liquid contaminants which comprises:

a. passing the gas mixture upwardly through an elongated vertical absorption column countercurrent and in intimate contact with a downwardly flowing liquid solvent composed of a mixture of dimethylethers of polyethylene glycols to effect absorption of substantially all of the normally liquid contaminants and all of the acid gas at a temperature within the range of 10° – 120°F. and a pressure of 100 – 2000 pounds per square inch absolute;

b. releasing combustible gas substantially free of normally liquid contaminants and containing less than 5 parts per million hydrogen sulfide;

c. passing the solvent containing the absorbed normally liquid contaminants and acid gas together with minor amounts of combustible gas to a flashing zone maintained at a pressure at least 50 pounds lower than the pressure in the absorption zone to effect liberation of dissolved combustible gas;

d. returning the liberated gases from the flashing zone to the absorption tower;

e. passing the solvent from the flashing zone to a stripping tower maintained at a temperature of from about 200° to 400°F. and a pressure within the range of 1 to 100 pounds per square inch absolute;

f. introducing steam into the bottom of the stripping tower to strip the solvent in the tower of acid gas substantially free of other constituents;

g. passing the solvent substantially free of acid gas from the bottom of the stripping column to a second stripping column maintained at a temperature of about 200° to 350°F. and a pressure of about 1 to 20 pounds per square inch absolute;

h. introducing steam into the second stripping tower to vaporize the normally liquid contaminants together with very minor amounts of acid gas;

i. condensing and collecting the normally liquid contaminants; and j. returning the lean solvent from the bottom of the second stripping column to the top of the absorption column.

12. The process for treating gas mixture derived from fossil fuels by carbonization, cracking, partial combustion or water gas reaction containing acid gas selected from the group consisting of hydrogen sulfide and carbon dioxide to remove minor amounts in the gas mixture of normally liquid non-acidic sulfur compounds which comprise:
   a. passing a dialkyl ether of a polyethylene glycol solvent having 1–8 carbon atoms in each alkyl group and 3–8 ethylene units in intimate contact with the gas mixture in an absorption zone to effect absorption of at least a major portion of the normally liquid non-acidic sulfur compounds;
   b. passing the solvent containing absorbed normally liquid non-acidic sulfur compounds together with some dissolved acid gas to a volatilization zone to vaporize the normally liquid non-acidic sulfur compounds and acid gases from the solvent;
   c. cooling the mixture of vapors of normally liquid non-acidic sulfur compounds and acid gas vaporized from the solvent to effect condensation of the normally liquid non-acidic sulfur compounds;
   d. collecting the liquid condensate to effect separation of normally liquid non-acidic sulfur compounds from the acid gas; and
   e. discharging the acid gas.

13. The process for treating a gas mixture derived from fossil fuels by carbonization, cracking, partial combustion or water gas reaction containing acid gas selected from the group consisting of hydrogen sulfide and carbon dioxide to remove minor amounts in the gas mixture of hydrogen cyanide which comprises:
   a. passing a dialkyl ether of a polyethylene glycol solvent having 1–8 carbon atoms in each alkyl group and 3–8 ethylene units in intimate contact with the gas mixture in an absorption zone to effect absorption of at least a major portion of the hydrogen cyanide;
   b. passing the solvent containing absorbed normally liquid contaminants together with some dissolved acid gas to a volatilization zone to vaporize the hydrogen cyanide and acid gases from the solvent;
   c. cooling the mixture of vapors of hydrogen cyanide and acid gas vaporized from the solvent to effect condensation of the hydrogen cyanide;
   d. collecting the liquid condensate to effect separation of hydrogen cyanide from the acid gas; and
   e. discharging the acid gas.

* * * * *